United States Patent [19]
Hedin et al.

[11] Patent Number: 5,872,975
[45] Date of Patent: Feb. 16, 1999

[54] AUTOMATIC RETARGETING OF PROCESSOR MODULES IN MULTIPLE PROCESSOR SYSTEMS

[75] Inventors: Raymond C. Hedin, Apple Valley; Kenneth R. Kaiser, Eagan, both of Minn.; Fernand Lucien Joseph Berard, Victoria; Kent D. Wotherspoon, Winnipeg, both of Canada

[73] Assignee: Lockheed Martin Corporation, Bethesda, Md.

[21] Appl. No.: 658,710

[22] Filed: Jun. 5, 1996

[51] Int. Cl.[6] .................................................. G01D 16/00
[52] U.S. Cl. .......................... 395/701; 395/704; 707/101
[58] Field of Search ................................... 395/500, 701, 395/704, 712; 707/101

[56] References Cited

U.S. PATENT DOCUMENTS

| | | | |
|---|---|---|---|
| 5,014,193 | 5/1991 | Garner et al. | 364/200 |
| 5,039,320 | 8/1991 | Heath et al. | 364/900 |
| 5,113,500 | 5/1992 | Talbott et al. | 395/325 |
| 5,321,814 | 6/1994 | Barajas et al. | 395/200 |
| 5,390,285 | 2/1995 | Wood | 395/23 |
| 5,430,878 | 7/1995 | Straub et al. | 395/700 |
| 5,555,416 | 9/1996 | Owens et al. | 395/700 |

*Primary Examiner*—Thomas Peeso
*Attorney, Agent, or Firm*—John L. Rooney; Glenn W. Bowen

[57] ABSTRACT

A computer system and method of operation has a retargeting program and apparatus which permits adding incorrectly targeted processors and a maintenance interface module (MIM) and automatically retargets them for the correct system. Each processor first determines its own system type, and the overall system type. Incorrectly targeted processors wait for retargeting, while correctly targeted processors select a master processor. The master processor retargets all incorrectly targeted processors by transferring an image of its correctly targeted firmware microcode into their RAM to be burned into their firmware. The MIM is retargeted using master processor code. Only accurately targeted or retargeted processors and MIM can be incorporated into the operating system.

15 Claims, 8 Drawing Sheets

GPC Base Addresses 602

| Identifier | Base Address |
|---|---|
| GPC0 | 0x46000000 |
| GPC1 | 0x4E000000 |
| GPC2 | 0x56000000 |
| GPC3 | 0x5E000000 |
| GPC4 | 0x66000000 |
| GPC5 | 0x6E000000 |
| GPC6 | 0x76000000 |
| GPC7 | 0x7E000000 |

FIG. 6

AUTOMATIC RETARGETING OF PROCESSOR MODULES IN MULTIPLE PROCESSOR SYSTEMS

FIELD OF THE INVENTION

This invention relates to automatically determining any mistargeted processors in a multiprocessor system and automatically retargeting them. This invention was made with Government support under Contract No. N62269-91-C-0422 awarded by the United States Navy. The Government has certain rights in this invention.

DESCRIPTION OF THE RELATED ART

A number of computer processor arrangements have been devised to change or determine a computer configuration. In U.S. Pat. No. 5,014,193, Garner et al. disclose a computer system including a dynamic configuration means for automatically initializing a peripheral system configuration on power-up.

U.S. Pat. No. 5,038,320 to Heath et al. discloses a non-volatile memory storing means for storing the identity value and parameter data of at least one identity card for comparison with a stored identity value to determine if a card has been changed.

U.S. Pat. No. 5,321,814 to Barajas et al. discloses a reconfigurable digital module computer system having a plurality of standard always-present modules and insertable additive optional modules. The system includes hardware reconfiguration logic means for reconfiguring the system when an added optional module is detected by establishing communication with optional modules.

U.S. Pat. No. 5,430,878 to Straub et al. discloses a data processing system which has an installed version of an operating system and at least one application program that knows it is compatible with a second different version of the operating system, and programming the second version of the operating system so that the application program believes it is compatible with the second version of the program and running the application program with the second version.

None of these previous inventions provides apparatus or a method for changing the targeting of a computer processor automatically to conform to another system, using only the system itself, to permit adding a new processor to a system without operator intervention or special equipment being required. This capability is desirable in that it minimizes potential errors in making a change, minimizes processor field inventory and eliminates any additional equipment in making such a change.

SUMMARY OF THE INVENTION

It is often necessary, as well as highly desirable, to provide common processor modules for use in a wide variety of system applications. Such common modules are typically identical in every respect except that microcodes may be different from system to system in order to operate most efficiently in a particular targeted application or system. These different microcodes are not those which provide the logic or arithmetic operations but are those microcodes which tailor the processor to a specialized application. This is commonly referred to as the processor displaying a different "personality". This practice of targeting processors for specialized applications has been used for years and is very effective.

In some instances it is desirable to use a processing module targeted for one system in a different system requiring a different personality, which requires a change in the microprocessor code. This can be accomplished in a variety of ways ranging from the replacement of programmed parts to reprogramming existing parts.

The instant invention allows substituting processors into a different system, with the system itself retargeting the processors for the new target system, by copying correct microcode from the firmware of a correctly targeted processor over the firmware of each incorrectly targeted processor. This retargeting is accomplished automatically in the field with no supplemental equipment being required. This requires that the processors have the personality portion of their microcodes, which tailor them to specific targeted system, located in firmware.

To accomplish this retargeting, each processor has apparatus which can accomplish the following: determine the overall system targeting, identify its own targeting and make that information available to all other processors, transfer an image of its own microcode firmware into the random access memory (RAM) of another processor, burn new firmware from microcode firmware transferred to its RAM, and determine whether firmware that has been transferred into its own RAM is transferred and burned into its PROM or other "non-volatile memory" correctly.

While all processors in the system have the above capabilities, the processor which actually retargets non-conforming processors is a designated "master" processor selected only from all correctly targeted processors.

When the retargeting program is started, after initialization, each processor determines its own targeting and the overall system targeting, and compares the two to determine whether it is correctly targeted. Any processors which are incorrectly targeted extinguish a LED light mounted on their respective processor card, which normally indicates correct operation when lit, and enters an indefinite wait loop waiting for RAM reprogramming and a firmware burn command.

All of the processors which are targeted correctly select a master processor from among their number. None of the incorrectly targeted processors participate in this selection because all of them have previously entered an indefinite wait loop.

After being selected, the master processor controls the retargeting process. The master processor first polls all processors to determine which are correctly targeted and which are incorrectly targeted. It then reprograms all incorrectly targeted processors by providing their RAM with an image of its own correct firmware microcode.

The master processor issues a burn command to incorrectly targeted processors after the RAM transfers to "burn" the transferred RAM contents into their firmware. After burning the RAM contents into their firmware, the incorrectly targeted processors determine if the firmware data has been transmitted and burned correctly. If incorrect, they lock themselves permanently out of the computation loop, otherwise they idle themselves until a restart of the retarget process determines that they are now correctly targeted which then incorporates them into the operating system.

The master processor also checks the maintenance interface module (MIM) to determine if it is correctly targeted for the system. If incorrect, the master processor reprograms the MIM to the correct target in a fashion similar to that used for the processors.

If all of the processors and the MIM are correctly targeted, a normal boot for the operational program is then entered. If any of the processors require reprogramming, they are reprogrammed, and if the MIM is correctly targeted the retargeting program is re-entered to automatically incorporate all correctly retargeted processors and the MIM into the system.

If the MIM is not correctly targeted the MIM is retargeted and the normal boot for the operational program is then entered. Any previously mistargeted but now correctly targeted general purpose controllers (GPCs) and MIM will not be incorporated into the system until the next operator manual restart.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 6 illustrates the GPC base addressing scheme;

DETAILED DESCRIPTION OF THE PREFERRED EMBODIMENTS

Figure 1:
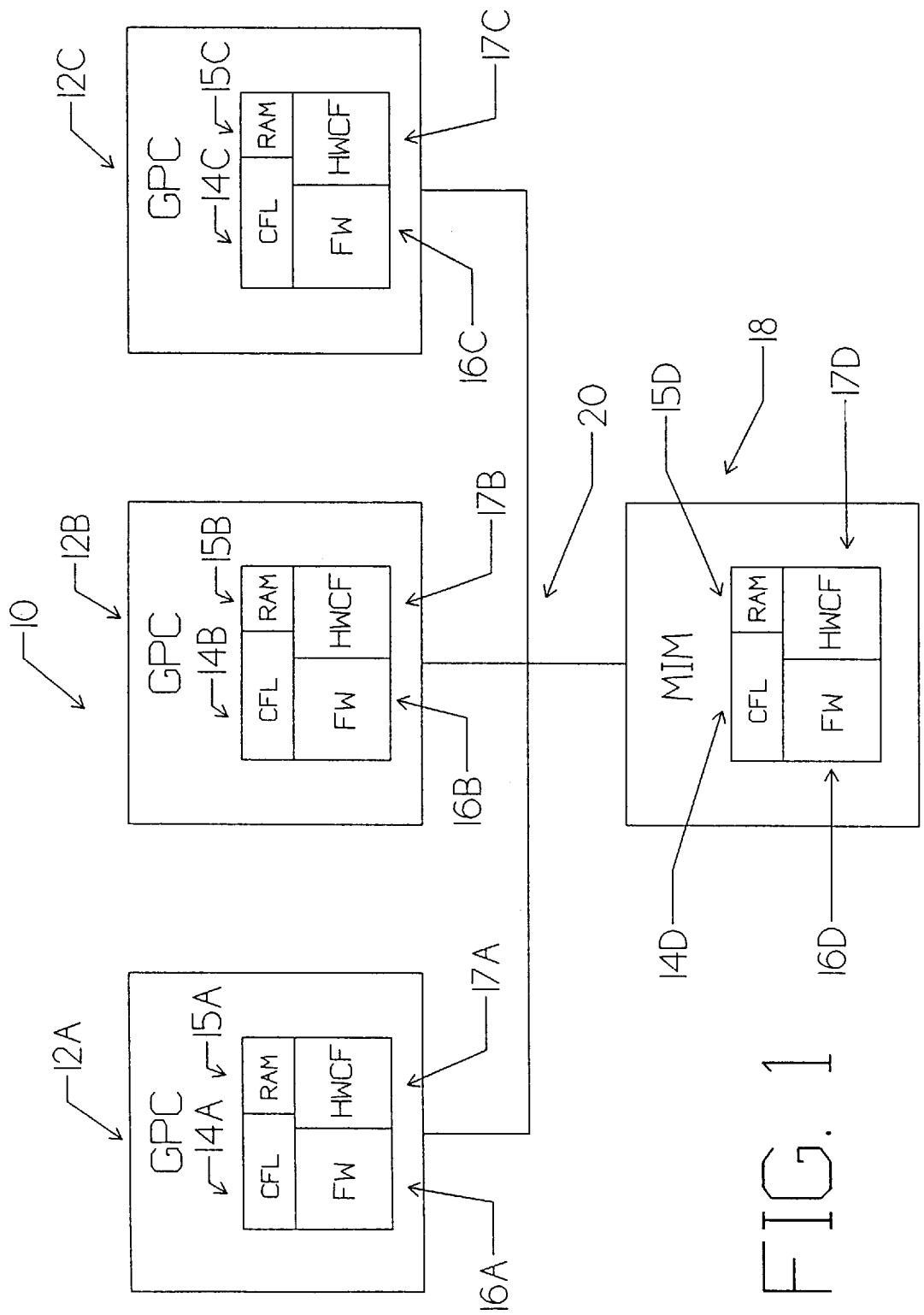
FIG. 1 is a block diagram of the system.

An overview of processing system 10 is shown in FIG. 1 with processors general purpose controllers (GPC) 12A, 12B and 12C comprised of common firmware loaders (CFL) 14A, 14B and 14C and hardware control firmware (HWCF) 17A, 17B and 17C respectively, providing the capability of changing data in the respective firmware (FW) 16A, 16B and 16C by burning in the contents of respective random access memories (RAM) 15A, 15B and 15C. FW 16 is comprised of EEPROM circuitry.

Maintenance interface module (MIM) 18 also has a CFL 14D, RAM 15D, FW 16D and HWCF 17D. MIM 18 provides various specialized maintenance operations under operator control separate from normal system operations.

All GPCs and the MIM, as well as other system devices not relevant to the instant invention, are electrically interconnected by interconnections 20.

Suffix letters have been added to the various component numbers to permit distinguishing the respective components of the GPCs and MIM from one another. This permits distinguishing differences in targeting.

There is only one MIM 18 for each system. The overall system type can be determined by the physical slot which the MIM is physically plugged into. The MIM physical location can provide a common reference for each GPC processor to determine whether it is targeted for the same overall system. This MIM card location can be determined by each processor, and is used by each to determine overall system type. This method of determining the MIM and overall system type is only one of a number of methods which could be used. Any other method detailed later, which provides the overall system type to all of the processors, can be used.

The targeting of GPCs 12A, 12B and 12C is determined by microcode instructions in their respective FW 16A, 16B and 16C. This firmware establishes the personality of the system having microcodes for specialized instructions. These specialized instructions are other than the arithmetic and logic instructions of the processor.

In a given GPC its CFL and HCFW together are required to substitute firmware loaded in its RAM from another GPC into its firmware. Certain CFL functions must be initiated by the HCFW in a prescribed sequence which will be described later. In order to transfer data from the firmware of one processor to the RAM of another, a personal GPC CFL record which is generated by each GPC individually, must be available to all processors. This record is denoted a "static" variable in that it must not be disturbed by system specific functions during data transfer from processor to processor. This record and its use will be described in detail later.

For purposes of explanation, it is assumed that data in firmware FW 16A and 16B in respective processors GPCs 12A and 12B is correctly targeted for an overall first system, also indicated by the physical slot location of MIM 18, while data in firmware FW 16C in GPC 12C is mistargeted for the first system and is instead targeted for a different system. In order to cause GPC 12C to conform to the first application, microcode data in firmware FW 16C must be changed to conform to the microcode data in either firmware FW 16A or 16B.

Figure 2:
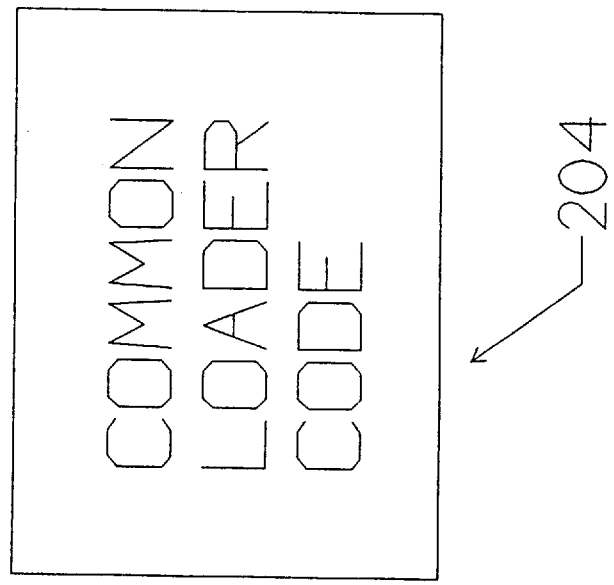
FIG. 2 are illustrations of legend outlines illustrating two code types.
Figure 2:
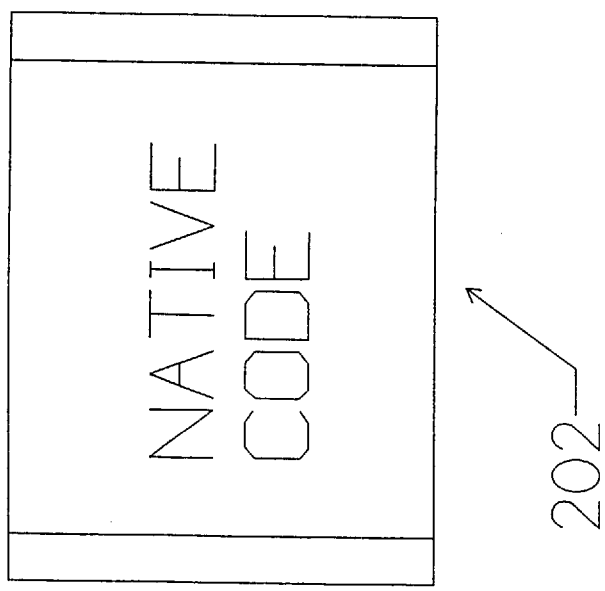

In FIG. 2 are shown legend blocks 202 and 204 surrounding the respective type of code designated by those blocks, namely respectively native code and common loader code. These legend blocks are used to differentiate between these two types of code in the various figures.

Figure 3A:
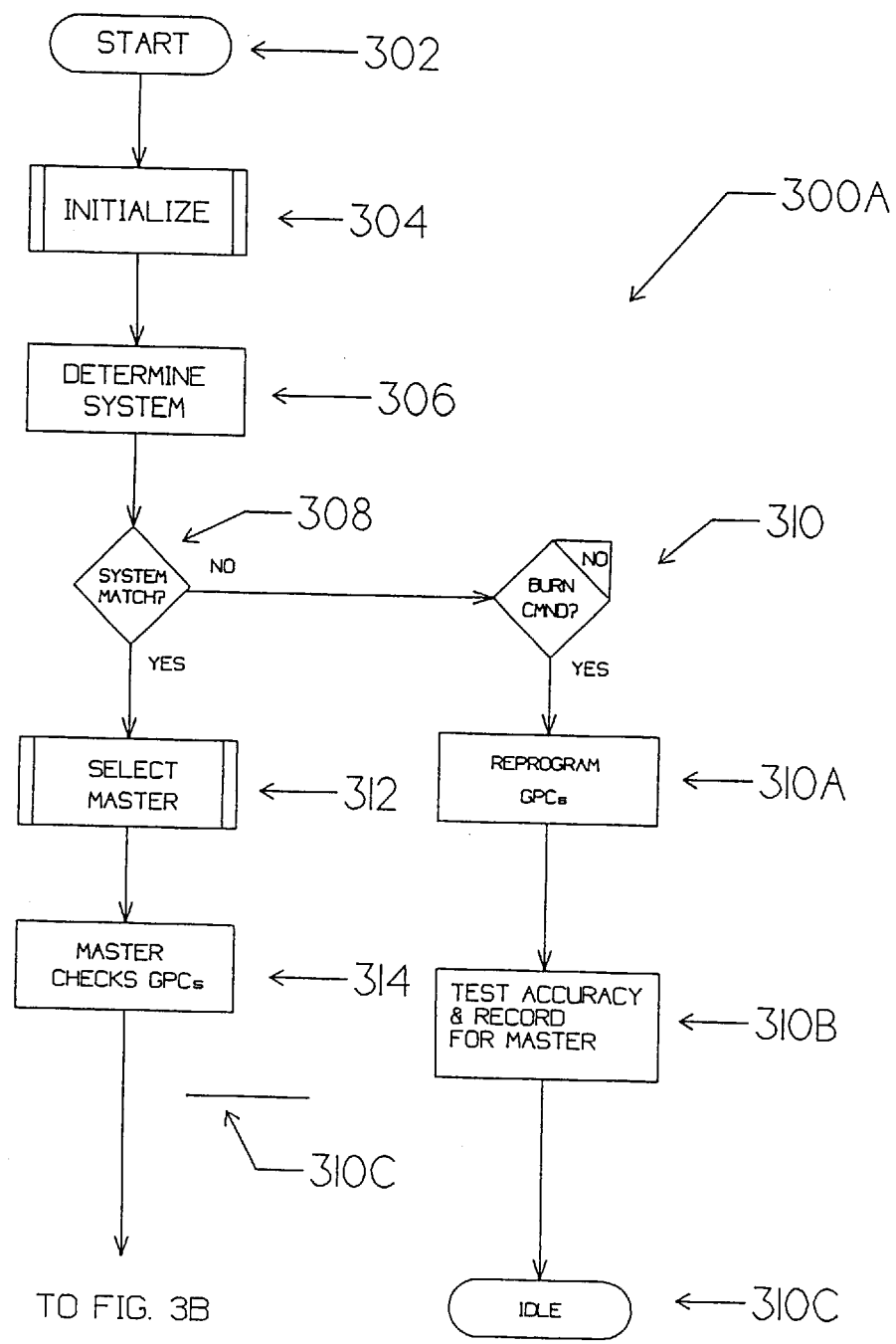
FIGS. 3A and 3B together provide a computer flow chart of the retargeting process.
Figure 3B:
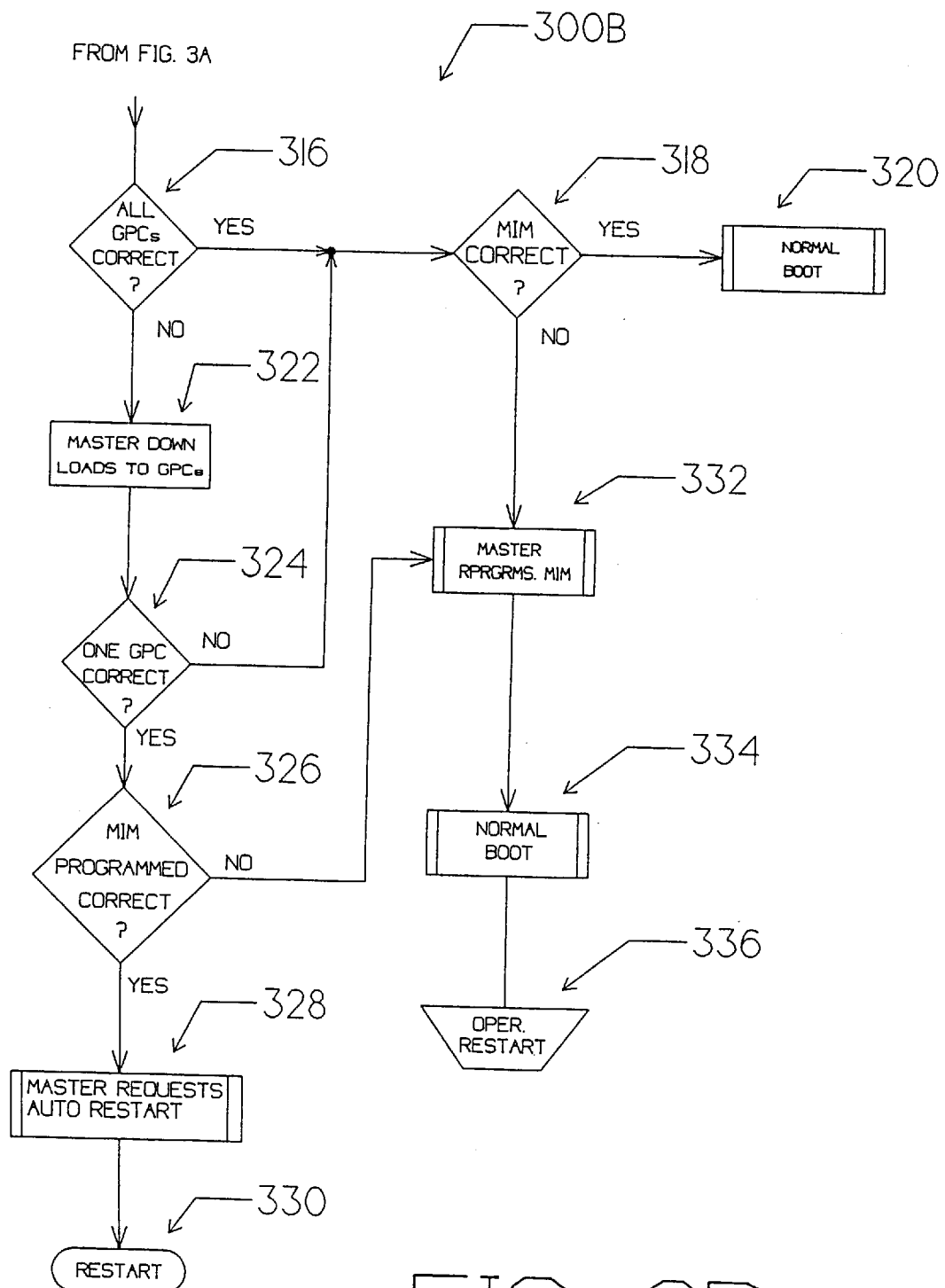

In FIGS. 3A and 3B code from the legend blocks 202 and 204 are shown with the same type of representation as the blocks of FIG. 2, namely native code and common loader code. These legend blocks provide differentiation between these two code types. Native code is code used in the system proper, while common loader code is that used to change the firmware.

In FIG. 3A the process 300A and in FIG. 3B the process 300B, both of which are used in the automatic retargeting of a mistargeted system, are shown. An overview of the operation of these steps will be described first followed by a detailed description of the operation of each individual firmware element plus all other functions and data entries necessary for these steps.

As shown in FIG. 3A, the process is begun by entering the "Start 302" step which initiates process 300A and enters the "Initialize 304" step. This process will be described further later. After initializing processors GPC 12A, 12B and 12C the "Determines System 306" step is entered. Here, each processor determines the overall system type by determining the physical slot location of MIM 18.

After each GPC processor has determined the overall system, each then determines its own firmware type, and compares that type with the previously determined overall system type in the "System Match? 308" step.

Five different methods which can be used by the individual processors in step 306 to allow them to determine their own targeted system are described below.

1. Unique System Identifier Location:

A unique application identifier can be provided. Such an identifier can be a location within each system which is specifically coded and unique to that system and different from all other systems.

2. Unique Application Location Used as Identifier:

The data location itself can be made unique for each system to provide identification.

3. A Unique Module for Each System:

A module which is unique for each system, which can be identified by the processors, can be used as a system identifier.

4. A Standard Module Placed at a Unique Location:

A standard module, which can be identified by the processors, but which is located at a different unique location for each system can be used as a system identifier.

5. A Plurality of Modules Can Imply the Application:

The process described above, in 4. "A Standard Module Placed at a Unique Location" is the preferred process for identifying the targeted system type for each processor used in step 306. The information as to its own system type determined by each processor in step 306 is also made available to all the other GPC processors.

This method of determining the individual system type, by having a unique location for a standard identifiable module for each, is only one of a number of methods which could be used. Any other method, which will provide the system type of each of the processors, can be used.

Any processor, which finds that it is not targeted correctly, as indicated by NO to step 308, will enter the "Burn Command? 310" step and will extinguish a LED on that processor card. A LED, mounted on each GPC processor card, is lighted to indicate proper operation of the processor. After extinguishing the light, the processor then enters an indefinite wait loop waiting for a firmware burn command. In this example, processor GPC 12C not being correctly targeted will not match the overall system type and will be the processor which will extinguish its LED in step 310.

All processors which are targeted correctly, as indicated by a YES to step 308, will enter the "Select Master 312" step where a master processor is selected. In the instant invention, the physical location of each processor card is used to determine the relative priority of each GPC with respect to all other GPCs, with the lowest numbered slot having the highest priority. This permits the GPCs to determine their relative priority and select the highest priority GPC as the master processor. The method used to select a "Master", however, is not significant. After selection, the master processor alone controls the remainder of the retargeting process. Since all incorrectly targeted processors are placed into an indefinite wait loop in step 310 they cannot participate in or be a candidate for master processor in step 312.

In this example, processor GPC 12C will not participate in step 312, while GPCs 12A and 12B are the candidate master processors. It is assumed here that processor GPC 12A is the processor installed in the lowest numbered slot having the highest priority, and is therefore, selected as the master processor.

Master processor GPC 12A, after being selected in step 312, then polls all the other processors in the "Master Checks GPCs 314" step to determine their individual targeted system type.

The steps in FIG. 3B are then entered where this targeting information is provided to the "All GPCs Correct? 316" step which determines if all the GPCs are targeted correctly when compared with the overall system targeting determined by the MIM slot location. If all processors are targeted correctly, as indicated by YES, then "MIM Correct? 318" step is entered. Step 318 determines whether MIM 18 is targeted correctly itself by investigating the contents of its FW 16D.

The MIM 18 has firmware FW 16D which must also be targeted correctly, i.e., must conform to the overall system type. A variety of methods can be used to provide this targeting information. However in the instant invention the data as to firmware type located in the FW 16D and investigated by master processor GPC 12A is compared with data located in the master processor RAM. If MIM 18 is targeted correctly, as indicated by YES, then the "Normal Boot 320" step is entered which automatically starts the normal targeted system operation with all GPCs and the MIM targeted correctly.

If the answer to GPCs Correct? 316 step is NO, this indicates that there is at least one GPC which is targeted incorrectly and "Master Down Loads to GPCs 322" step is entered where the firmware information from the correctly targeted master processor is loaded into the RAM of all incorrectly targeted processors. In this example, Master processor GPC 12A will transfer an image of its firmware from FW 16A to RAM 15C of GPC 12C since that is the only mistargeted GPC. If there were any other incorrectly targeted processors, an image of the master processor firmware would also be sent to their RAM at this time. This step loads the RAM of any mistargeted GPC with a copy of correct firmware from the master processor. The significance of this is that no other system resources, such as a load device, are required.

After an image of the firmware has been sent to the RAM of all mistargeted processors, here GPC 12C, then a burn command is sent to step 310, which each incorrectly targeted processor has entered. In this example, this will direct GPC 12C to burn the firmware image transferred into its RAM 15C into its firmware FW 16C in the "Reprogram GPC 310A" step using CFL 14C and HWCF 17C. Again, if there were any other mistargeted processors, they would also have had their RAM loaded with an image of the correct firmware and be in a wait loop waiting for a burn command, and would be commanded to burn their RAM contents into their firmware at this time.

After step 310A is complete "Test Accuracy & Record for Master 310B" step is entered where the accuracy of the burn is tested. Here a cyclical redundancy test is performed by GPC 12C to determine if the information transferred from the master processor to RAM 15C and burned into firmware FW 16C was accurate. Other approaches can be used instead of the cyclical redundancy test such as a conventional checksum test. In this example, the accuracy of the image transfer to RAM 15C and the accuracy of the transfer from the RAM to firmware FW 16C is determined in step 310B. The idle step 310C is then entered which will idle the retargeted processor, here GPC 12C, until system start is reentered at which time the entire retargeting of FIGS. 3A and 3B will be repeated. Since the retargeted processor is now targeted correctly, it will no longer enter step 310, but will be available for incorporation into the system after step 312.

The information from step 310B as to the reprogramming accuracy is also provided to Master processor GPC 12A at the "One GPC Correct? 324" step. If none of the processors were reprogrammed correctly, this would be indicated by NO, which would then cause step 318 to be entered where MIM targeting would be determined. This route is essentially an escape mode of operation. This is provided so that already correctly targeted processors can continue toward normal operation of the system. Otherwise, a tight loop attempting to retarget failing processors might exist. Providing this escape path allows the correctly targeted processors to operate the system.

If the answer to step 324 is YES, then at least one GPC has been retargeted correctly, which, in this example, would be GPC 12C and "MIM Programmed Correct? 326" step is then entered. In step 326 the correct targeting of MIM 18 is determined as described earlier. If step 326 is correct, indicated by YES, then "Master Requests Auto Restart 328", i.e., "Master Requests Restart", step is entered automatically. This in turn will call up the "Restart 330" step. Step 330 automatically calls up Start 302 step which repeats the steps of FIGS. 3A, 3B, to incorporate all correctly retargeted processors into the system.

If MIM 18 is targeted incorrectly, indicated by NO in step 326 then "Master Rprgrms. MIM 332", i.e., "Master Reprograms MIM", step is entered. This will cause GPC 12A to retarget MIM 18 using the approach described earlier.

If MIM 18 is inoperative, or otherwise cannot be retargeted, this fact is noted in "Normal Boot 334" step. Since the system now has at least one correctly targeted processor, and since the system can function in its normal operating mode without an operating MIM, a normal boot is entered here whether MIM 18 can be reprogrammed or not.

Since an operational MIM is required for an automatic restart, GPCs are not automatically incorporated into the operating system until "Operator Restart 336" step is entered manually by the operator. When step 336 is entered by the operator, then Start 302 step will be entered to repeat the steps of FIGS. 3A and 3B and automatically incorporate all correctly retargeted processors into the system.

GPC CFL and MIM CFL Records:

The GPC CFL Record and GPC MIM CFL Record provide status and other information between the GPC processors and the MIM necessary for coordinating the retargeting operations. The following information is used to determine these records.

Figures 4, 5:
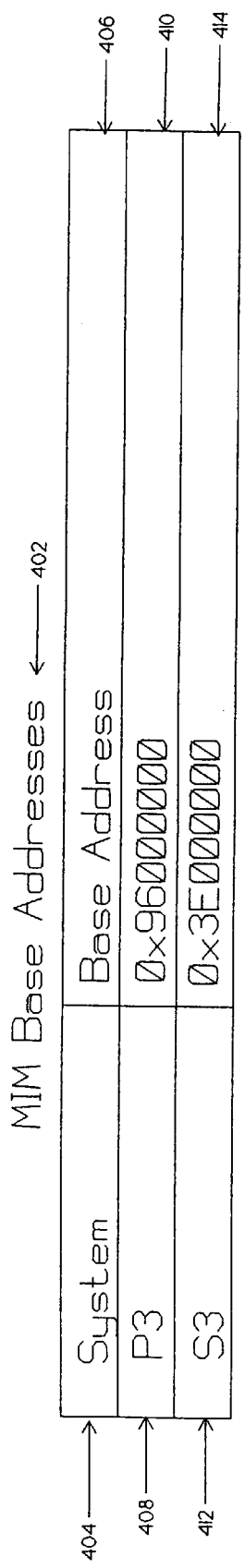
FIG. 4 illustrates the base addressing scheme.
FIG. 5 illustrates the values for system and firmware types.

FIG. 4 shows MIM Base Address 402 with the System 404 and its corresponding Base Address 406. System P3 408 has a base address of 0x96000000 410 and system S3 412 has base address 0x3E000000 414. The system type search is conducted using these addresses and a fixed offset to access the MIM CFL record, of FIG. 8.

If the record is valid, i.e., contains a proper authentication field and validation bits, then the MIM CFL firmware type from the MIM CFL Record is copied to the GPC CFL Record 722. If one and only one valid MIM slot is found, the GPC CFL Record 706 is updated with the proper system type; otherwise it is set to unknown.

FIG. 5 shows the possible System and Firmware Types 502 having a Value 504 for each Type 506. This shows that value 0 508 is Unknown 510, value 1 512 is reserved 514, value 2 516 is reserved 518, value 3 529 is P-3 System or FW 522, value 4 524 is reserved 526, value 5 528 is S-3 System or FW 520, all other values 532 are reserved 534. This information is used to determine whether the MIM is mistargeted. The MIM is considered mistargeted if the system type has been determined and it does not match the MIM firmware type as indicated in the GPC CFL Record. If the MIM is targeted correctly, it is released by writing a value into the MIM CFL record which will be described later.

FIG. 6 shows the GPC Base Addresses 602 with an Identifier 604 corresponding to each Base Address 606 having respectively GPC0 608 versus 0x46000000 610, GPC1 612 versus 0x4E000000 614, GPC2 616 versus 0x56000000 618, GPC3 620 versus 0x5E000000 622, GPC4 624 versus 0x66000000 626, GPC5 628 versus 0x6E000000 630, GPC6 632 versus 0x76000000 634, GPC7 versus 0x7E000000 638. These addresses identify the processor number.

GPC CFL Record:

The GPC CFL Record is accessed from the GPC CFL firmware during the determine system step 306. This will be described further later. The record is a static variable in that it must not be disturbed by any system specific functions between the executions of the CFL functions.

Figure 7:
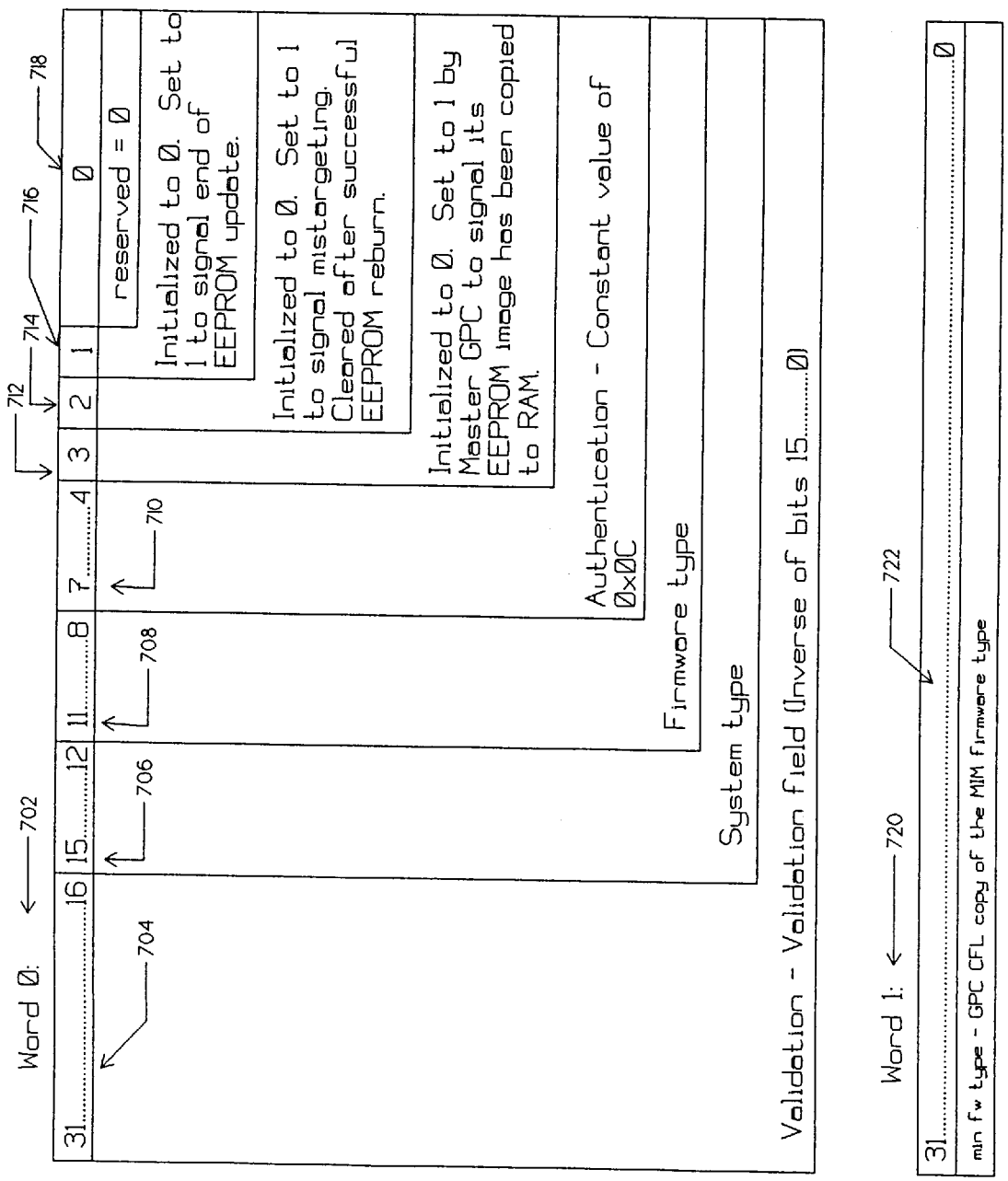
FIG. 7 illustrates the two words comprising the GPC CFL Record.

In FIG. 7, the GPC CFL format is shown to consist of two 32 bit words, Word 0 702 and Word 1 720, which are written by each GPC CFL firmware into address 01010000 Base 16 in each GPC's RAM into two sequential 32-bit locations.

In Word 0 702: Bit 0 718 is reserved and is always set equal to 0 (FIG. 7). Bit 1 716 is initialized to 0 and set to 1 by the retargeted processor to indicate the end of a firmware EEPROM update. Bit 2 714 is initialized to 0 and later set to 1 by a mistargeted GPC and later cleared to 0 after a successful EEPROM reburn. Bit 3 712 is initialized to 0 and set to 1 in a mistargeted GPC by the Master GPC to signal that the Master GPC EEPROM image has been copied to the mistargeted GPC RAM. Bits 4 through 7 710 are authentication bits and have a constant value of 0xC. Bits 8 through 11 708 provide information as to the firmware type. Bits 12 through 15 706 provide information as to the system type. Bits 16 through 31 provides a validation field number which is the inverse of bits 15 through 0.

Word 1 720 in bits 0 through 31 722 contains a GPC CFL copy of the MIM firmware type.

Figure 8:
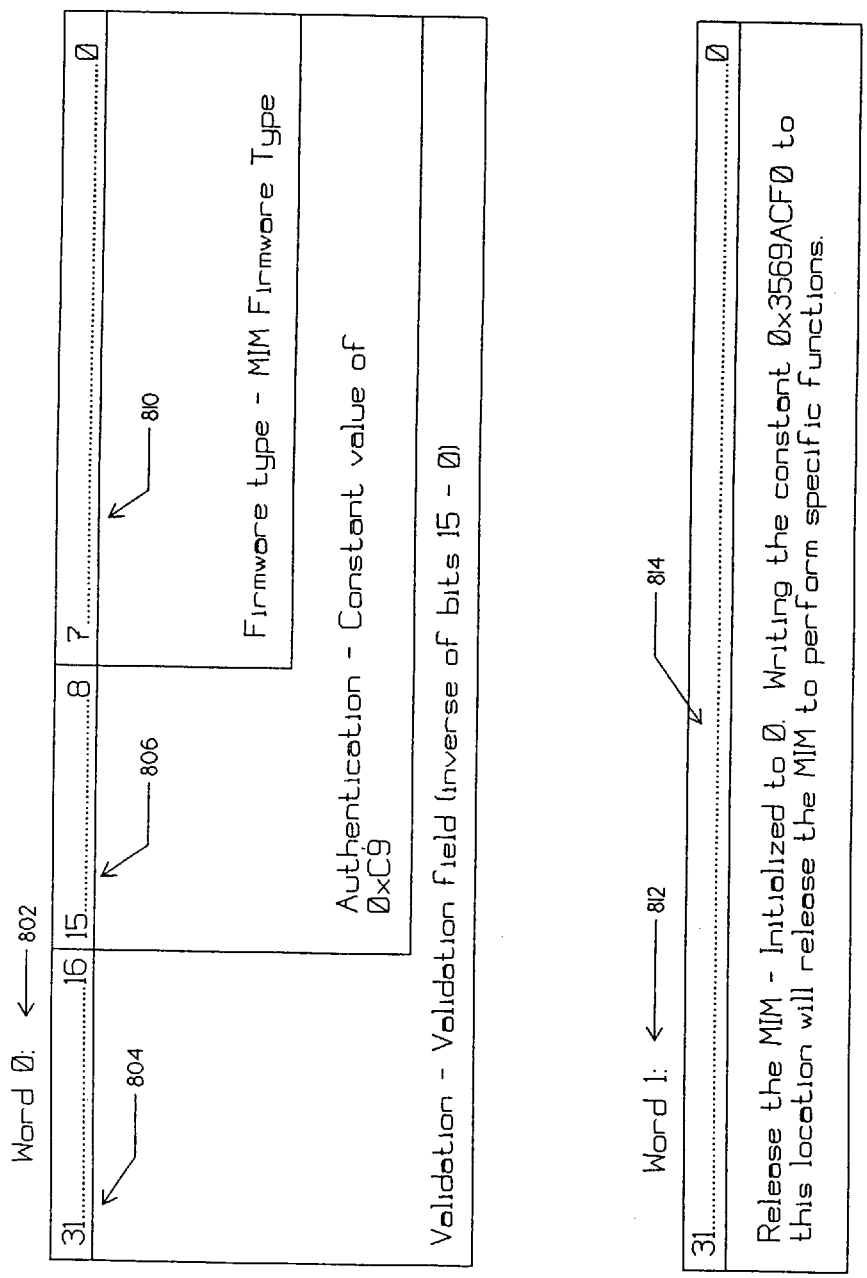
FIG. 8 illustrates the two words comprising the MIM CFL Record.

MIM CFL Record:

The MIM CFL Record, shown in FIG. 8, provides status and other information between the GPC processors and MIM necessary for coordinating the retargeting operations.

The MIM CFL Record consists of two 32 bits words, Word 0 802 and Word 1 812. This record begins at address 03B0 base 16 in the MIM RAM and consists of two sequential 32-bit memory locations. Word 0 is read by all the GPCs and Word 1 is written by all GPCs and read by the MIM CFL.

Word 1 changes as the result of the retargeting operations data as indicated and a more detailed description follows.

In Word 0 802: Bits 0 through 7 810 provides the MIM firmware type information. This will be described further later. Bits 8 through 15 806 provides authentication and has a constant value of 0xC9. Bits 16 through 31 804 provide validation and is the inverse of bits 0 through 15. In word 1 812 all the bits are initialized to 0. Writing the constant 0x3569ACF0 base 16 to this location will release the MIM to perform system specific functions.

Design, Operational and Hardware Constraints:

The system specific functions perform power-up initialization and self-test regardless of their system type. This ensures that CFL functions are not attempted using dysfunctional GPCs. Failures will cause that GPC to go off-line (system non-operational) with the LED extinguished.

The GPC EEPROM firmware image must contain a 16-bit CRC in the last EEPROM location (7FFE base 16). The image of the master GPC's EEPROM placed in the RAM of the mistargeted GPC to reburn its EEPROM is located in addresses 0x01100000 to 0x01107FFF base 16 in the GPC RAM.

An image of a mistargeted GPC's EEPROM is placed in its own RAM by the mistargeted GPC. This is used by the mistargeted GPC as a program area while the EEPROM is being reburned. This image is located in addresses 0x01008000 to 0x0100FFFF base 16 in GPC RAM.

Retargeting a MIM requires a minimum of 20 seconds to reburn the firmware.

The occurrence of a Hardware Master Clear while a GPC or MIM EEPROM is being burned may result in a non-functional GPC or MIM which can not be retargeted by the CFL.

Whenever the MIM is retargeted, since it cannot perform a system reset, the operator should manually reset the system to bring successfully retargeted GPCs into the system.

Overview:

This invention provides an apparatus and a method for the automatic determination of a mistargeted processor and automatic retargeting of that processor, which permits transferring processors between applications with a minimum of effort, by simply incorporating the processor into any other system, and allowing the system itself to automatically and accurately retarget and incorporate the foreign non-conforming processor into that system after being adapted for that application. This is made possible by having the resources required for this change contained wholly within the local processing area of the resident system and wholly within the system itself. This results because the processor firmware provides that part of the microprocessor code, which gives the computer the required personality for any specific application.

Previously, as a minimum, such an interchange required intermediate programming of the firmware when moving a processor from one application to another. This apparatus and process provides such an interchange automatically with positive assurance than a mistargeted processor has been retargeted accurately. This provides the capability of drawing a processor from a common source with no concern for the processor's targeted application.

This capability for retargeting an incorrectly targeted processor needs no outside data for retargeting since the available correct firmware data of a correctly targeted processor is used. When the microcodes from the firmware of the correctly targeted master resident processor are accurately copied over the microcodes of a incorrectly targeted processor's firmware, that processor is then made identical in every respect to the resident accurately targeted processors of the system. While EEPROM was designated as the preferred memory to be used here, any memory with similar electrical characteristics can be used in its stead.

This invention provides an apparatus and a method which permits transferring hardware processing modules between a variety of different system applications by simply incorporating the processor into any other system, and allowing the system itself to automatically and accurately retarget and incorporate the foreign incorrectly targeted processor into that system after being reprogrammed for that system. This results because the processor firmware provides that part of the microprocessor code which gives the computer the required personality for any specific application. This personality change is accomplished automatically in the field with no human intervention being required, and with the complete assurance that the change is accomplished accurately before the foreign processor is incorporated into the system.

While this apparatus teaches changing the personality of a non-conforming processor by changing its firmware, the same principal can be applied to conform a processor program which is not contained in firmware. If the step of burning code transferred from the master processor to the non-conforming processor, this same approach can be used to change a non-conforming program to a target program.

Further, this invention teaches the use of two steps, the first step identifies an overall targeted system and individual targeted processor systems. This information may be valuable for other purposes other than automatically retargeting processors. This information could be used to simply inform the operator that a retargeting problem exists for further operator action.

The second step of actually retargeting incorrectly targeted processors, would still provide a valuable assistance to an operator even if some of the steps required operator intervention. One element of that step, namely the selection of a master processor, could be automated or could be operator selected. Other steps, such as the burning of the transferred RAM data of the non-conforming processor into firmware for retargeting could also require operator intervention and still be functional. Among the advantages of automating the entire process, described earlier, is that any potential operator errors are eliminated.

In the embodiment described here, the firmware data of each processor must conform for proper targeting. In other applications the only change between processors may be the code in the random access memory. In that case, the transfer of code from a correctly targeted to an incorrectly targeted processor, rather than a change in firmware, would be adequate to retarget the processor. In that event, all steps relating to burning new firmware into a non-conforming processor would be omitted.

While this system has been described as using processors which are physically close together and directly electrically interconnected, this is not an absolute requirement. Electrical interconnections must be provided between all of the processors and the MIM for proper retargeting, but these could use an intermediate network with the capability of transferring the required reprogramming information a great distance between system elements in widely separated locations. This capability could be useful for such things as resisting downloaded computer viruses since here firmware must be changed to reconfigure a processor. Conceivably the front end of a processor could contain virus resistant firmware microcode which could not readily be changed to provide a virus resistant system.

This capability can also be applied to the reuse of hardware modules or cards of a specific general type which may be configured in a different manner for a different system or processing application. Commonly in large systems there are a number of cards of the same functional type. As an example, parallel processing computers may utilize a number of compatible processors, processing modules or cards which have a common firmware basis that determines the compatibility and nature of the processing modules for a particular application. If the modules are to be used in a different application, the firmware configuration control may be different with the remaining portion of the processing modules remaining the same. The same principles apply to other types of modules, such as I/O devices, network switches, and memory modules.

Another advantage of the instant invention is in the replacement of defective processors. Previously processors had to have the target system installed which normally required an intermediate programming operation before the processor was installed in the system. This apparatus and method eliminates this step in the replacement of a defective processor from inventory in the field.

While this invention has been described with respect to a specific embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. Retargeting computer apparatus comprising:
   a) a computer system having an overall system type; and
   b) a plurality of processors each processor having:
      i.) an individual system type;
      ii) means for determining its own individual system type;
      iii) means for determining the overall system type;
      iv) means for determining when the individual system type is correctly targeted matching the overall system type, and when the individual system type is incorrectly targeted not matching the overall system type; and
      v) means for incorrectly targeted processors to enter a wait loop.

2. An apparatus as in claim 1 wherein each processor has means for signaling the operator when it is incorrectly targeted.

3. Apparatus as in claim 1 to ensure the compatibility of the controlling firmware on all operating processor modules.

4. Apparatus as in claim 1 to ensure that the controlling firmware contained on all operating processor modules is identically the same.

5. Apparatus as in claim 1 having means for correctly targeted processors to transfer a targeting copy of the code which targets the incorrectly targeted processors such as to reprogram incorrectly targeted processors into correctly targeted processors, said apparatus having:
   a) firmware:
   b) a random access memory:
   c) firmware loading means for burning the targeting code code transferred to said random access memory over a selected portion of the firmware with the copy of the targeting code being located in firmware;
   d) means for correctly targeted processor to select a master processor from among their number; and
   e) said means for correctly targeted processors to transfer a copy of targeting code to incorrectly targeted processors being restricted to code obtained wholly from the master processor firmware with the code being transferred to the random access memory of all incorrectly targeted processors.

6. Retargeting computer apparatus comprising:
   a) a computer system having an overall system type; and
   b) a plurality of processors each processor having:
      i) an individual system type;
      ii) means for determining its own individual system type;
      iii) means for determining the overall system type;
      iv) means for determining when the individual system type is correctly targeted matching the overall system type, and when the individual system type is incorrectly targeted not matching the overall system type;
      v) means for incorrectly targeted processors to enter a wait loop; and
      vi) means for correctly targeted processors to transfer a targeting copy of the code which targets the incorrectly targeted processors such as to reprogram incorrectly targeted processors into correctly targeted processors, said means having:
         a) firmware;
         b) a random access memory;
         c) firmware loading means for burning the targeting code transferred to said random access memory over a selected portion of the firmware with the copy of the targeting code being located in firmware;
         d) means for correctly targeted processor to select a master processor from among their number; and
         e) said means for correctly targeted processors to transfer a copy of targeting code to incorrectly targeted processors being restricted to code obtained wholly from the master processor firmware with the code being transferred to the random access memory of all incorrectly targeted processors.

7. Retargeting computer apparatus comprising:
   a) a computer system having an overall system type;
   b) a maintenance interface module having an individual system type; and
   c) a plurality of processors each processor having:
      i.) an individual system type;
      ii) means for determining its own individual system type;
      iii) means for determining the overall system type;
      iv) means for determining when the individual system type is correctly targeted matching the overall system type, and when the individual system type is incorrectly targeted not matching the overall system type;
      v) means for incorrectly targeted processors to enter a wait loop; and
      vi) means for correctly targeted processors to transfer a targeting copy of the code which targets the incorrectly targeted processors such as to reprogram incorrectly targeted processors into correctly targeted processors, said means having:
         a) firmware;
         b) a random access memory;
         c) firmware loading means for burning the targeting code transferred to said random access memory over a selected portion of the firmware with the copy of the targeting code being located in firmware;
         d) means for correctly targeted processor to select a master processor from among their number; and
         e) said means for correctly targeted processors to transfer a copy of targeting code to incorrectly targeted processors being restricted to code obtained wholly from the master processor firmware with the code being transferred to the random access memory of all incorrectly targeted processors;
      vii) means for determining the system type of the maintenance interface module;
      viii) means for comparing the maintenance interface module system type with the overall system type; and
      ix) means for changing the system type of the maintenance interface module to be compatible with the overall system type.

8. Method of retargeting computer apparatus comprising:
   a) providing:
      i) a computer system having an overall system type;
      ii) a plurality of processors each processor having an individual system type; having means for determining its own individual system type; having means for determining the overall system type; having means for determining when the individual processors are correctly targeted matching the overall system type; and when individual processors are incorrectly targeted not matching the overall system type; and iii) having means for incorrectly targeted processors to enter a wait loop; and b) each processor determining the overall system type and determining its own system type and incorrectly targeted processor entering a wait loop to await reprogramming by the eventual master processor.

9. Method of retargeting computer apparatus comprising:
a) providing:
   i) a computer system having an overall system type;
   ii) a plurality of processors each processor having an individual system type; having means for determining its own individual system type; having means for determining the overall system type; having means for determining when the individual processors are correctly targeted matching the overall system type; and when individual processors are incorrectly targeted not matching the overall system type;
   iii) having means for incorrectly targeted processor to enter a wait loop;
   iv) having means for correctly targeted processors to transfer a copy of the code targeting to incorrectly targeted processors such as to reprogram incorrectly targeted processors into correctly targeted processors and wherein said method further comprises a correctly targeted processor transferring a copy of the targeting code which targets the processor to incorrectly targeted processors such as to reprogram incorrectly targeted processors into correctly targeted processors; and
b) each processor determining the overall system type and determining its own system type and incorrectly targeted processor entering a wait loop to await reprogramming by the eventual master processor.

10. A method of retargeting computer apparatus comprising:
a) providing:
   i) a computer system having an overall system type;
   ii) a plurality of processors each processor having:
      a) an individual system type;
      b) means for determining its own individual system type;
      c) means for determining the overall system type;
      d) means for determining when the individual system type is correctly targeted matching the overall system type, and when the system is incorrectly targeted not matching the overall system type;
      e) means for incorrectly targeted processors to enter a wait loop;
      f) firmware;
      g) a random access memory;
      h) means for transferring targeting code from firmware to the random access memory of another processor;
      i) firmware loading means for burning code transferred to said random access memory from another processor over the existing firmware;
      j) means for determining if code transferred from another processor into its random access memory and then burned into its firmware is accurate and, having the targeted processor remain in the wait loop until the retargeting method is reentered;
   iii) a maintenance interface module having an individual system type;
   iv) each processor further having: means for determining the system type of the maintenance interface module; means for comparing the maintenance interface module system type with the overall system type; and means for changing the system type of the maintenance interface module to be compatible with the overall system type;
b) each processor determining the overall system type;
c) each processor determining its own system type;
d) each incorrectly targeted processor entering an indefinite wait loop;
e) all correctly targeted processor selecting a master processor;
f) said master processor comparing all other processors targeting with the overall system targeting and if all processors are targeted correctly then checking the targeting of the maintenance interface processor, and if the maintenance interface processor is targeted correctly entering a normal boot, and if not targeted correctly having the master processor change the maintenance interface module system type to be compatible with the overall system type and then entering a normal boot program; if any of the processors are not targeted correctly then having the master processor transfer that portion of its firmware code containing the targeting information into the random access memory of each incorrectly targeted processor;
g) each incorrectly targeted processor then burning the transferred contents of its random access memory over its current firmware, determining the accuracy of the transfer and the burned copy and providing an accuracy status to the master processor; remaining in the idle program awaiting restart; and
h) having the master processor determine if the maintenance interface module is targeted correctly, and if it is targeted incorrectly entering the normal boot program, and if it is targeted correctly then having the master processor determine if at least one incorrectly targeted processor has been retargeted correctly, and if no processors have been retargeted correctly entering a normal boot program and if at least one processor has been retargeted correctly then repeating this method by means of a system restart to bring the correctly retargeted processor into the system as described in f) above.

11. In a computer system comprising of a plurality of processor means each of which is intended to have a compatible targeting system, the improvement comprising:
a) source means for supplying information that indicates a desired correct targeting system for said computer system;
b) system recognition means associated with each of said processor means comprising:
   i) first system recognition means for determining if the associated processor means has a current targeting system which is of predefined type;
   ii) second system recognition means coupled to said source means for determining said correct targeting system; and
   iii) matching means coupled to said first and said second recognition means for determining if the current targeting system in the associated processor means is the correct targeting system; and
c) retargeting means coupled to said matching means of all of said processor means for selecting as a master processor means one of said processor means that contains a copy of said correct targeting system means and for substituting a compatible copy of said correct targeting system from said master processor means in all of said other processor means that did not have correct targeting system in place of the formerly incorrect targeting system of said processor means.

12. In a computer system as claimed in claim 11, the further improvement wherein said targeting system that is copied from said master processor means is an identical copy of said correct targeting system.

13. In a computer system as claimed in claim 11, the further improvement wherein at least one of said plurality of processor means functions as a maintenance processor for said computer system.

14. In a computer system as claimed in claim 13, the further improvement wherein said targeting system that is copied from said master processor means is an identical copy of said correct targeting system.

15. A method for insuring compatibility between the individual targeting systems of each of a plurality of processor means in a computer system which is intended to have a predetermined common correct targeting system in all of said processor means comprising:

a) supplying information to all of said processor means that identifies said correct targeting system;

b) performing a self-examination of each of said processor means of its targeting system to determine if the targeting system of each of said processor means is the correct targeting system;

c) selecting one of said processor means that has a correct targeting system as the master processor system; and d) substituting a copy of said correct targeting system from said master processor means in all of said other processor means that did not have said correct targeting system in place of the formerly incorrect targeting system of said processor means.

* * * * *